MAXIMILIAN LOUIS J. CHOLLET AND CELESTE H. E. HAMILTON, OF PARIS, FRANCE.

Letters Patent No. 84,731, dated December 8, 1868.

IMPROVED POULTICE-CLOTH.

The Schedule referred to in these Letters Patent and making part of the same.

*To whom it may concern:*

Be it known that we, CELESTE H. E. HAMILTON and MAXIMILIAN LOUIS J. CHOLLET, have invented a new and improved Poultice; and we do hereby declare that the following is a full, clear, and exact description of our invention.

The object of our invention is the preparation of square pieces, or, as we call them, leaves of cloth, single, or of two or more thicknesses, destined, when dampened, to make poultices by their strict adhesion to the skin.

To carry out our invention, we take two or more thicknesses of canvas or muslin, of coarse, spongy texture, capable of absorbing a great quantity of mucilaginous substances. The mucilaginous substances consist of decoctions of marsh-mallow, flax-seed, bran, or starch.

To apply the mucilaginous substances, we proceed by spreading them with a brush, or by any other means, often repeating the operation.

We use, in preference, a thin decoction, as we have remarked, that, in concentrating the decoctions, desiccation takes place too slowly; in consequence, it was found advantageous to repeat the impregnation, drying the steeped canvas or muslin after each impregnation.

This desiccation can be effected in the open air or by any other means.

We obtain in this manner leaves of canvas, of two or more thicknesses, containing a great quantity of mucilaginous substances, which can be made effective under the influence of the cold or warm water in which these leaves are steeped, either to be used as poultices, or to saturate the water with the substances they contain, this water being thus appropriated to all needful requirements of toilet or hygiene.

In the place of superposed textures, a single cloth may be used, having the necessary conditions of thickness and absorption.

These artificial poultices have the advantage of adhering closely to the wound, and of preserving for a long time their heat and moisture, provided they are carefully covered over with a piece of oiled silk.

Having thus described our invention,

What we claim, and desire to secure by Letters Patent, is—

An article of manufacture, consisting of a poultice, composed of leaves of canvas or muslin, impregnated with mucilaginous substances, substantially as herein described.

In testimony whereof, we have signed our names to this specification, before two subscribing witnesses.

HAMILTON.
M. CHOLLET.

Witnesses:
   F. OLCOTT,
   ANSART.